Oct. 11, 1955  F. H. JOHNSON ET AL  2,720,273
TWO-WHEEL AUTOMOTIVE VEHICLE FRAME AND SEAT ARRANGEMENT
Filed Aug. 19, 1950  4 Sheets-Sheet 2

INVENTOR.
FRED H. JOHNSON
FRANK L. DEMOREST
BY
Barnes, Kisselle, Laughlin & Raisch
ATTORNEYS

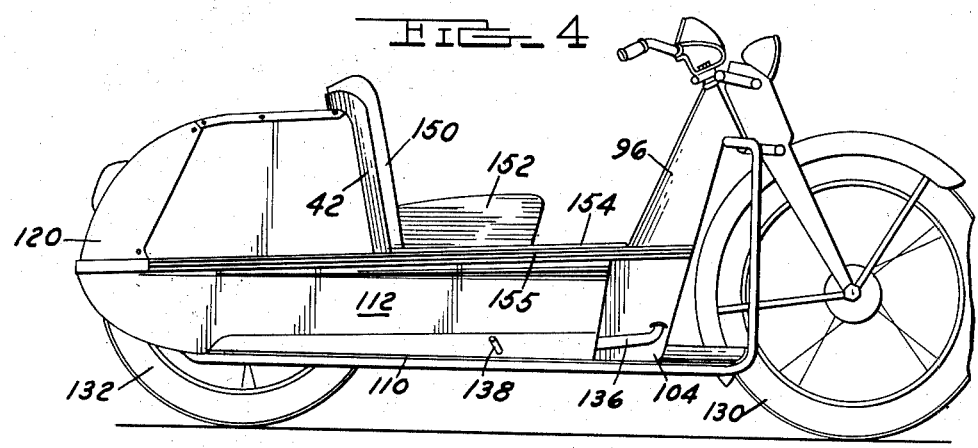
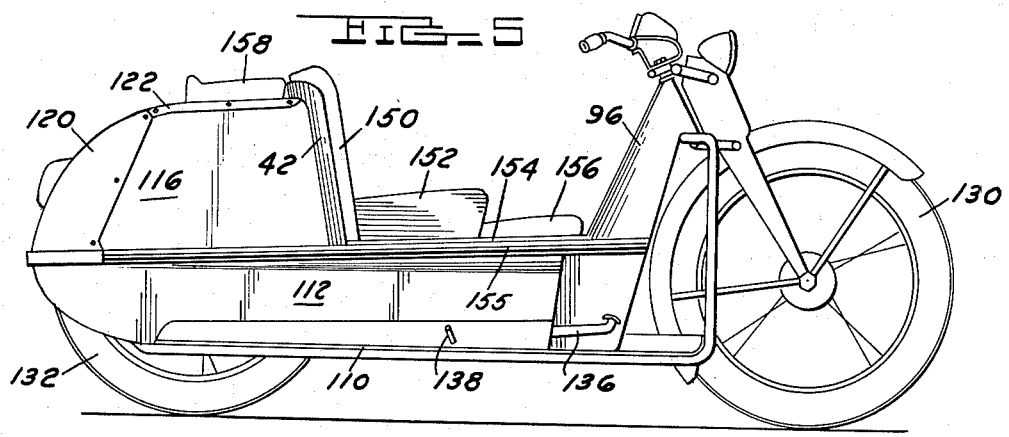
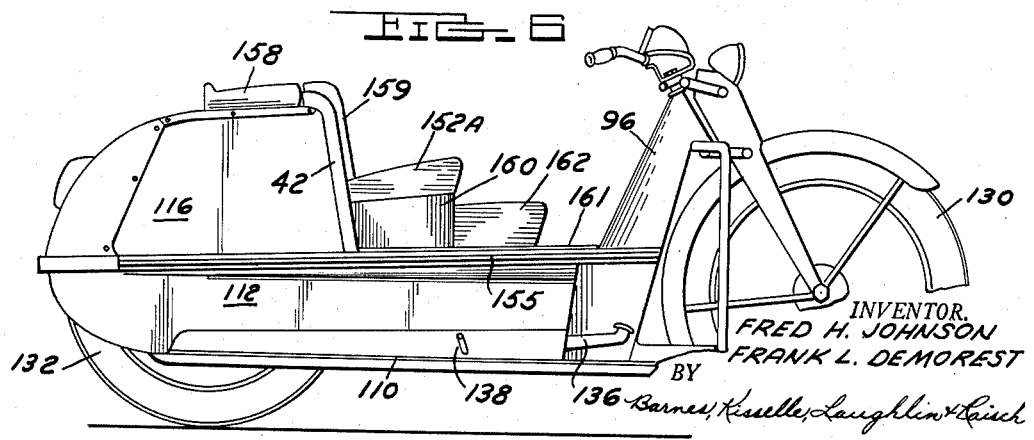
INVENTOR.
FRED H. JOHNSON
FRANK L. DEMOREST
BY Barnes, Kisselle, Laughlin & Raisch
ATTORNEYS

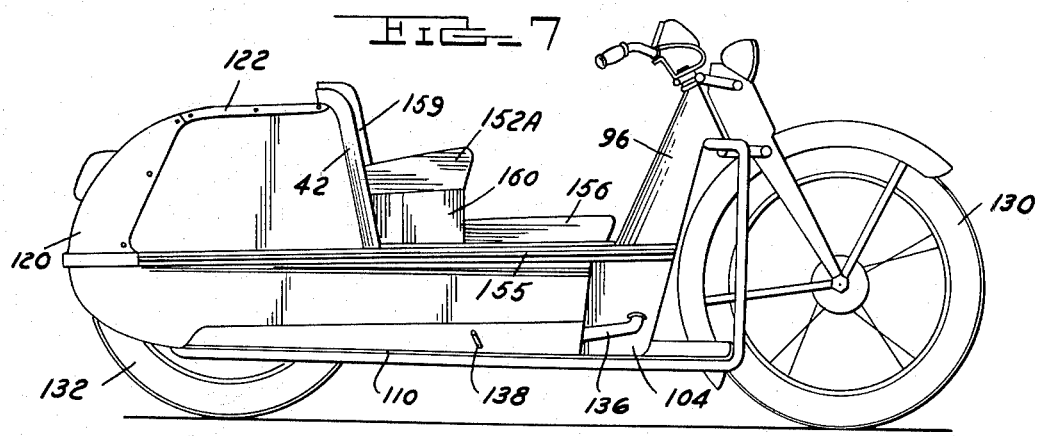
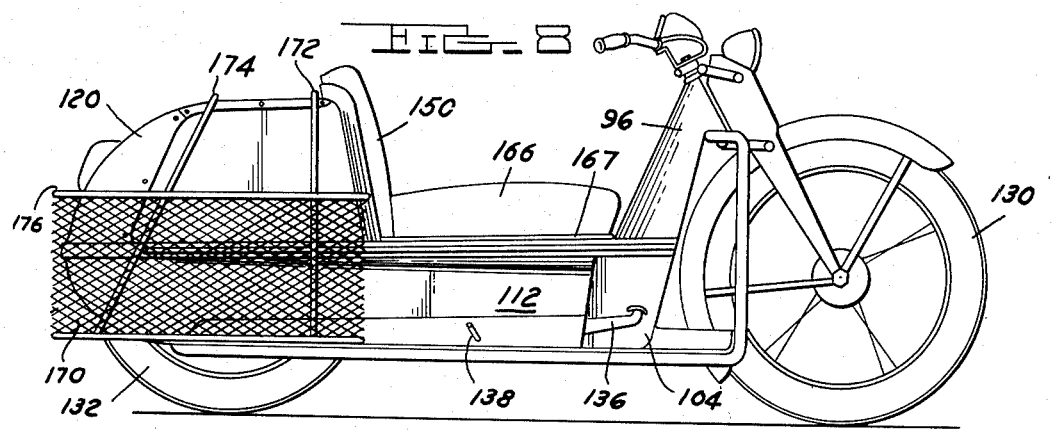
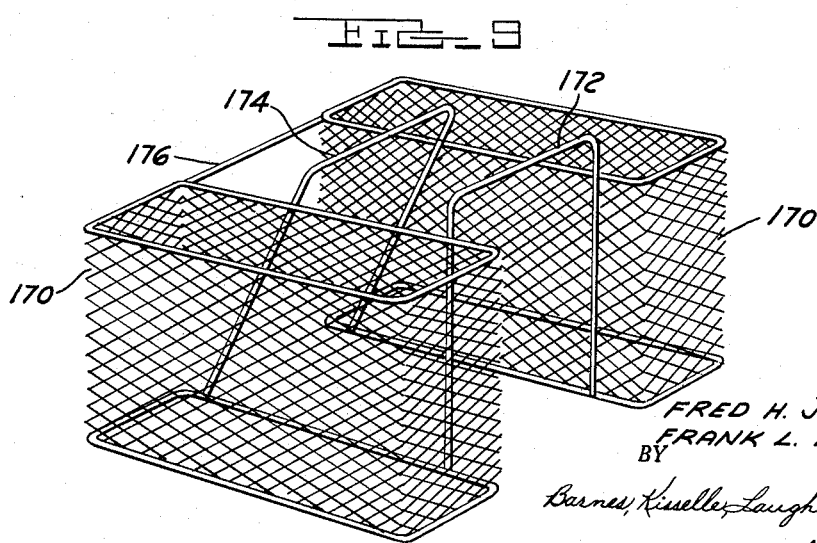

United States Patent Office 2,720,273
Patented Oct. 11, 1955

2,720,273
TWO-WHEEL AUTOMOTIVE VEHICLE FRAME AND SEAT ARRANGEMENT

Fred H. Johnson and Frank L. Demorest, Detroit, Mich.; said Demorest assignor to said Johnson Application August 19, 1950, Serial No. 180,376

2 Claims. (Cl. 180—33)

This invention relates to a two-wheel automotive vehicle and has particularly to do with a frame and seat arrangement for such vehicle.

The basic object of the present invention is the provision of a family-type power cycle in which the working parts are completely enclosed and which is especially adapted for a plurality of passengers or for passenger and luggage load.

It is an object to provide such a design with a very low center of gravity and a structurally unified frame member which will serve not only as a support for the body of the unit and the passengers but also as a guard rail and foot rail.

More specifically, the basic frame assembly is adapted to receive at least five different seat combinations, depending on the number and the size of the passengers to be carried.

Other objects and features of the invention include a special air cooling arrangement for an enclosed motor which adapts itself to the particular unitary frame design and further details respecting the housing construction and ready removal of certain portions thereof to permit access to the working parts.

Figure 1:
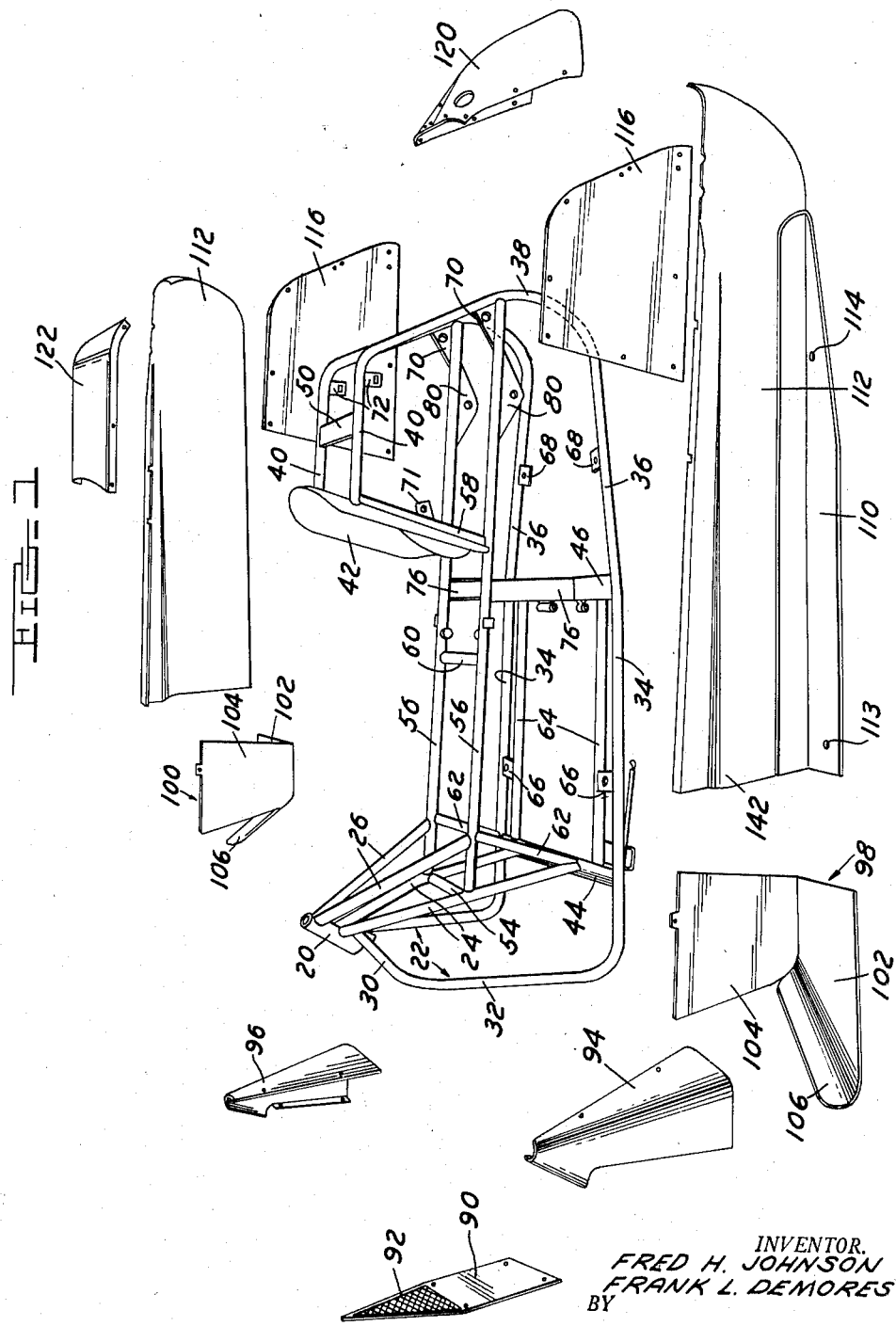

Drawings accompany the specification, and the various views thereof may be briefly described as:

Figure 1, a perspective exploded view of the unitary frame and body parts showing their relation to the frame and to each other.

Figure 2:
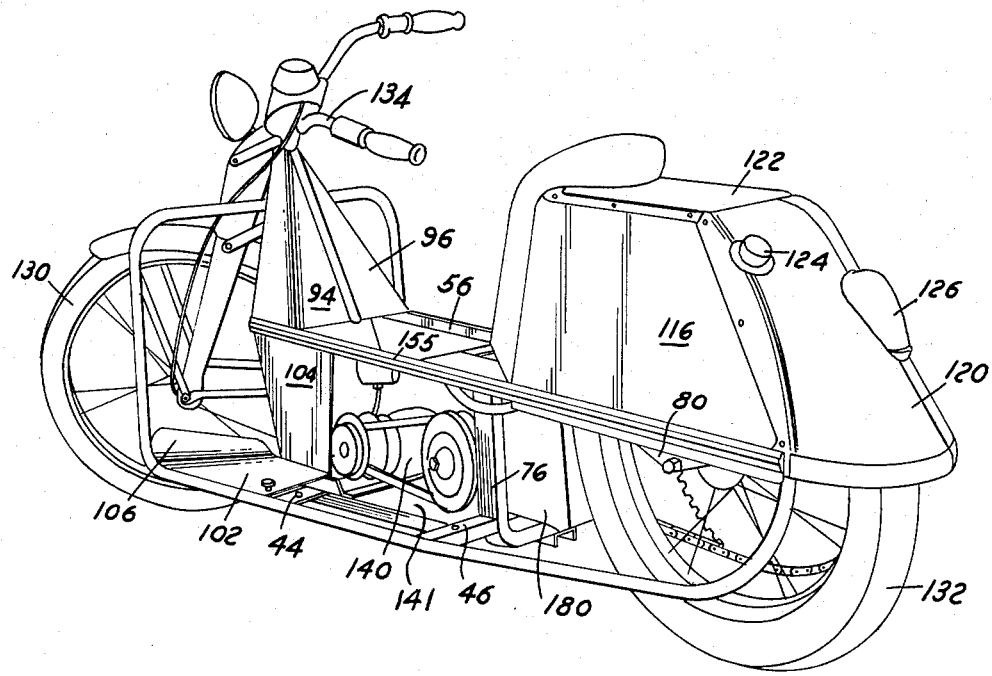

Figure 2, a perspective view of the power cycle with portions of the body assembled.

Figure 3:
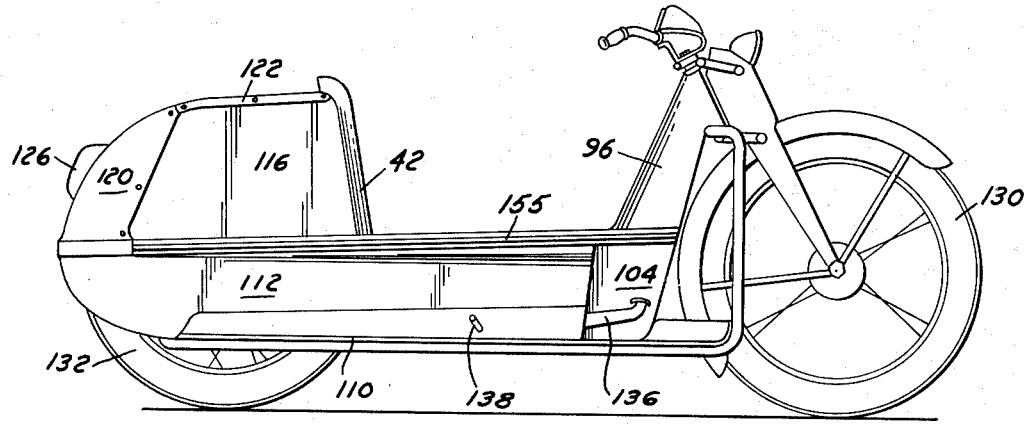

Figure 3, a side elevation of the complete basic unit.

Figures 4, 5, 6, and 7, side elevations similar to the basic unit shown in Figure 3 with various seat adaptations applied thereto.

Figure 8, a side elevation showing the mounting of a basket carrier.

Figure 9, a perspective view of the basket carrier.

Referring to the drawings, the basic frame for the power cycle is shown in Figure 1 formed of tubular members. A front wheel mounting tube 20 which serves as a steering column for a standard front wheel assembly is supported by six structural members arranged in pairs on either side of the frame and designated respectively at 22, 24, and 26.

The members 22 are continuous members which extend outwardly at 30 and downwardly at 32 to form a front guard rail. The member then continues in a side guard rail 34, angling to the rail at 36, curving upwardly at 38 to a horizontal portion 40, terminating at a seat back plate 42.

Side guard rail members 34 are connected across the frame by a structural member 44. The forward end of the rearwardly extending portions 36 is connected across the frame by a structural member 46. The horizontal members 40 are connected by a structural bar 50.

It will be seen that the previously mentioned support members 24 angle upwardly from the cross bar 44 starting at a point spaced inwardly from the side rail 34. A cross piece 54 extends between the sides of members 24 to reinforce them, and extending back from the location of this cross member 54 are horizontal stringers 56 connected to the back portion 38 of the continuous tubular frame member 22. The bottom of the seat back plate 42 terminates at the stringers 56 and is reinforced by risers 58 extending upwardly to the portions 40.

Stringers 56 are connected centrally by a tube 60, and at the forward end it will be seen that the supporting members 26 rise at an angle to the steering column 20. Additional struts 62 extend from the bottom of members 24 to the bottom of the members 26. Parallel motor supporting tubes 64 extend between the cross members 44 and 46.

Between members 64 and members 34 are fastening bars 66 which will be referred to later. On members 36 fastening lugs 68 are fastened, extending inwardly. A fastening gusset 70 lies in the corners between members 56 and 38 and additional tabs 71 and 72 are provided on members 50 and 58.

Rising vertically from cross members 46 to connect to the stringers 56 are structural members 76. All of the structural members are welded together and are preferably formed as tubular or semi-tubular members. Thus, a unitary frame construction is provided.

The space below the members 56 and above the members 64 is intended to house the power unit and any transmission that will be used in connection therewith. The space between the members 56 at the rear will house a rear supporting wheel which will be mounted on triangular members 80 extending downwardly from these members.

Between the seat back 42 and the members 26 and above the stringers 56 is the main seating capacity of the unit, as will be later described.

It will be seen that the bulk of the weight of the unit assembled lies below the members 56 and thus below the centerline of the wheels. From the following description it will also be seen that the passenger load is positioned relatively low, being primarily between the wheels and just above the axles.

The body panel parts for the frame as described above are shown in exploded position in Figure 1. A front panel 90 has a triangular top portion 92 formed of a grill member either of reticulated metal or some other screen-like material. This panel is screwed onto member 24 and forms a front splash plate and air inlet.

Two other front frame members consist of bent plates 94 and 96 having two triangular shaped sides which fit over members 24 and 26, respectively, on either side. These members are also screwed in place. These members 94—96 act as an air scoop to force air down over the top of the engine.

Forward running board panels are shown at 98 and 100 consisting of a runing board member 102 and a vertical side plate 104. These members are fastened in the corners of the guard rail 32—34 and have an up-turned portion 106 which will co-operate with a front splash guard, not shown, which can be applied in muddy weather to the bars 30—32. All of these front panel members are shown in place in Figure 2.

The main running board and side panel member consist of a horizontal strip 110 and a vertical panel 112. This panel mounts on the side rail 34 and extends upwardly to the stringers 56. It is intended that these combination side and running board panels 110 and 112 should be mounted for quick removal and quick attachment. Accordingly, suitable quick release cam lock fasteners are provided for this purpose to co-operate with the plates 66 and 68, holes 113 and 114 being provided for this purpose.

Wheel plates 116 are provided to extend upwardly from stringers 56 to tube 40. These plates co-operate with a back plate 120 and a top plate 122 to complete the wheel housing at the rear of the vehicle. In Figure 2 all of these plates are found in position except the running board plate 110—112.

The gas tank for the vehicle may be a part of plate 116 lying between the plate and the wheel on one or both sides of the wheel, a filling pipe 124 extending through panel 120. A tail light 126 is mounted on panel 120.

The assembled power cycle is shown in Figure 2 with a front wheel 130 and a rear wheel 132. The front wheel is mounted through the mounting tube 20 and guided by handle bars 134 in conventional manner.

As shown in Figure 2, the motor and transmission is indicated at 140 lying within the space defined by the members 56 and 64 and supported between members 44 and 46 on a plate 141 which is removable with the entire engine and transmission as a unit. Practically all of the working parts of the machine are exposed when the plate 112 is removed from either side. Thus, in the event of engine trouble it is a simple matter to expose the engine for service. On the other hand, when the unit is completely assembled as shown in Figure 3, the working parts are completely covered except for the necessary operating levers such as a combination starting and brake lever 136 shown in Figure 3 and a heel brake lever 138 shown also in Figure 3; but if engine overhaul is necessary, removal of plate 141 is a matter of removing a few bolts and a substitute engine may be installed to keep the cycle in service.

As best shown in Figure 1, the side panel 112 has an offset portion 142 which presents a forward opening to the motor chamber since this offset portion extends outwardly beyond the upright panel 104 which is forward of panel 112. These openings serve on both sides of the vehicle as air intakes to cool the working parts and also to cool panel 112 adjacent the feet of the riders. The other air opening, of course, is that furnished by the grill 92 which projects air into the motor chamber through the passage formed by panels 94 and 96 and the lower front plate 90.

As shown in Figure 3, the basic power cycle unit is illustrated with a back panel 42 being the only part of the seat structure shown. This basic unit may be adapted to at least five different seat units.

In Figure 4, a single seat construction is shown in which a padded back member 150 is snapped onto the back panel 42 by snaps, not shown, and a padded upholstered seat 152 is mounted on an engine cover plate 154 which rests in a recess on members 56 between molding strips 155 on the side of the assembly.

A similar seat construction is shown in Figure 5 with another small seat cushion 156 mounted in front of seat 152 snapped onto cover plate 154, and a rear seat 158 mounted over the rear wheel behind the seat 150. This arrangement, as shown in Figure 5, will easily accommodate two adults and one child. A slightly different construction is shown in Figure 6 in that a shorter, thinner back rest 159 is mounted on back plate 42 and a main seat 152 is mounted on a box frame 160 to extend considerably higher than in the previous construction. Box 160 is permanently mounted on a second engine cover plate 161. In front of this box 160 is a removable upholstered cushion 162 snapped into place when desired. This unit in Figure 6 will accommodate three adults.

In Figure 7, the seats are arranged somewhat similarly to Figure 6 with seat 152A and back rest 159, and a longer, shallower child's seat 156 is mounted in front of the main seat.

In Figure 8, the utility model is shown having one long seat cushion 166 extending between the padded back and the front end of the seat well mounted on a third motor cover plate 167. This model can easily seat two adults. Also, in Figure 8 is shown a carrier basket supported on the rear wheel housing. This carrier basket consists of two wire baskets 170 formed of screen or reticulated metal and connected by two metal arches 172, 174 and also at the back by a connecting bar 176. These arches 172 and 174 are locked onto the rear seat housing in a suitable manner so that the device may be used to carry groceries or other small objects.

Another storage compartment 180 is provided directly in front of the rear wheel, below the seat space, and supported on hanger member 76 (see Figure 2). This space is available from the top when the seat is removed. It may be used for the front splash guards and for tools and miscellaneous objects.

As previously stated, the bars 30 and 32 which constitute the continuous frame member extending along the entire frame and up to member 40 will serve as supporting members for canvas or leather dirt guards which are snapped across the front end of the vehicle.

The members 34 and 36 are slanted back toward the rear wheel so that the machine can make a very short turn without dragging these bars on the ground. In fact, in a short turn the bars 34 and 36 lie practically parallel with the ground and also prevent overturning in the event of loss of balance or too sharp a turn. In addition, bars 34 and 36 also serve as protection for the feet throughout the entire length of the vehicle and provide a long running board to permit the use of the device by at least three people.

The easily replaceable panels on the unit make it quite simple to repair the unit in case of damage by accident and also permit various color combinations to be applied at the choice of the purchaser when buying a machine.

We claim:

1. An automotive bicycle having a frame and a dirigible wheel mounted thereon at one end with a power wheel supporting the other end of the frame, said frame comprising sysmmetrically shaped tubes extending in continuous line on either side of the frame originating at a point forward and above an intermediate engine supporting portion of the frame at the front wheel mounting and each extending outwardly and downwardly to provide a front guard rail and extending rearwardly and inclined inwardly toward the rear wheel to provide a ground-line guard and extending upwardly and forwardly to a point adjacent the rear and top of a seat panel location, a horizontal panel means between said continuous tube members to support an engine substantially below centers of the wheels of the vehicle, and a second panel means above said engine between said wheels to support one or more vehicle passengers and a third panel above said rear wheel supported on the ends of said continuous members.

2. A two-wheel automotive vehicle of the type having a forward dirigible wheel and a rear power wheel, including a frame comprising substantially parallel spaced members extending longitudinally of the frame, a forwardly inclined triangular unit at the front end of said parallel members to provide an attaching point for the front wheel, means adjacent the center of said parallel members rising and inclined slightly rearwardly connected by a seat panel as a part of the frame, and continuous tubular members extending from the top portion of said seat panel on either side of the frame rearwardly, and forward at an outwardly inclined angle to the front of the vehicle and then upwardly and inwardly to connect to the top portion of the front riser, said continuous members forming at the rear a support for the rear wheel housing and a rear seat behind the seat back, at the bottom a ground-line guard and at the forward portion a front guard member, a power unit supported between said wheels at a level substantially below the centers of the wheels on said continuous tubular members, a seat panel on said parallel spaced members providing seating capacity for one or more passengers between the centers and the top of the wheels and further load-supporting means to the rear of said seat panel on said continuous tubular members above the rear wheel.

References Cited in the file of this patent

UNITED STATES PATENTS

| | | |
|---|---|---|
| 1,109,424 | Kiefer | Sept. 1, 1914 |
| 1,183,939 | White | May 23, 1916 |
| 1,343,788 | Onar | June 15, 1920 |
| 1,390,441 | Jackson | Sept. 13, 1921 |
| 1,511,631 | Page | Oct. 14, 1924 |
| 1,858,743 | Langstreth | May 17, 1932 |
| 2,035,462 | Courtney | Mar. 31, 1936 |
| 2,201,639 | Tingle | May 21, 1940 |
| 2,237,677 | Lewis | Apr. 8, 1941 |
| 2,468,367 | Holderness | Apr. 26, 1949 |
| 2,525,877 | Dolphin | Oct. 17, 1950 |
| 2,551,982 | Verkins | May 8, 1951 |
| 2,583,499 | Teegen | Jan. 22, 1952 |

FOREIGN PATENTS

| | | |
|---|---|---|
| 909,104 | France | Nov. 26, 1945 |
| 947,613 | France | Jan. 17, 1949 |
| 158,101 | Great Britain | Jan. 31, 1921 |
| 155,199 | Great Britain | Jan. 12, 1922 |
| 232,707 | Great Britain | Apr. 30, 1925 |
| 556,398 | Great Britain | Oct. 4, 1943 |
| 352,325 | Germany | Apr. 24, 1922 |
| 359,084 | Italy | May 13, 1938 |
| 412,839 | Italy | Feb. 16, 1946 |
| 85,802 | Switzerland | July 1, 1920 |
| 101,918 | Switzerland | Dec. 1, 1923 |
| 270,733 | Switzerland | Dec. 16, 1950 |
| 138,714 | Great Britain | Feb. 19, 1920 |
| 370,050 | Germany | Feb. 26, 1923 |